(12) United States Patent
Hiruta et al.

(10) Patent No.: US 8,308,191 B2
(45) Date of Patent: Nov. 13, 2012

(54) AIRBAG APPARATUS

(75) Inventors: Teruhiko Hiruta, Tokyo (JP); Makoto Ogawa, Tokyo (JP)

(73) Assignee: Takata Corporation, Tokyo (JP)

( * ) Notice: Subject to any disclaimer, the term of this patent is extended or adjusted under 35 U.S.C. 154(b) by 142 days.

(21) Appl. No.: 12/926,191

(22) Filed: Nov. 1, 2010

(65) Prior Publication Data

US 2011/0115202 A1    May 19, 2011

(30) Foreign Application Priority Data

Nov. 9, 2009   (JP) .................................. 2009-256394

(51) Int. Cl.
*B60R 21/26* (2006.01)
(52) U.S. Cl. ....................................................... 280/736
(58) Field of Classification Search ................... 280/736, 280/739, 740, 743.1, 741
See application file for complete search history.

(56) References Cited

U.S. PATENT DOCUMENTS

| | | | | |
|---|---|---|---|---|
| 7,237,802 B2* | 7/2007 | Rose et al. | ................. | 280/743.1 |
| 7,380,822 B2* | 6/2008 | Abe | ........................... | 280/743.1 |
| 7,458,607 B2* | 12/2008 | Abe | ............................... | 280/739 |
| 7,481,456 B2* | 1/2009 | Nozaki et al. | .............. | 280/743.1 |
| 7,726,685 B2* | 6/2010 | Abe et al. | ...................... | 280/736 |
| 7,770,926 B2* | 8/2010 | Schneider et al. | ......... | 280/743.2 |
| 7,845,681 B2* | 12/2010 | Abe et al. | ................... | 280/743.1 |

FOREIGN PATENT DOCUMENTS

| | | |
|---|---|---|
| JP | 2005-153726 | 6/2005 |
| JP | 2005-271736 | 10/2005 |
| JP | 2005-297715 | 10/2005 |

* cited by examiner

*Primary Examiner* — Faye M. Fleming
(74) *Attorney, Agent, or Firm* — Manabu Kanesaka (57) ABSTRACT

An airbag apparatus includes a gas generator that generates gas, and an airbag inflated and deployed by the gas supplied from the gas generator. The airbag restrains an occupant in a first state in which the occupant's chin is positioned on the airbag apparatus or the occupant in a second state in which the occupant's chin is positioned on a steering wheel. The airbag includes one main exhaust port, a vent cover provided to cover the one main exhaust port, and at least one sub exhaust port without a vent cover. The sub exhaust port exhausts the gas without using the main exhaust port in a state in which the vent cover blocks the main exhaust port due to a folded state of the airbag in an initial stage of an inflating and deploying operation performed to restrain the occupant in the first state or in the second state.

6 Claims, 7 Drawing Sheets

Before inflating and deploying operation

Fig. 6(b)

Initial stage of inflating and deploying operation

AIRBAG APPARATUS

BACKGROUND OF THE INVENTION AND RELATED ART STATEMENT

The present invention relates to an airbag apparatus that is provided in a vehicle such as a car.

Hitherto, an airbag apparatus has been used to restrain an occupant by actuating a gas generator to inflate an airbag when a vehicle crashes, overturns, or is involved in other emergency situations (for example, refer to Patent Document 1).

This airbag apparatus includes an airbag stored in a folded state and a gas generator (inflator) that supplies gas to the airbag. When a vehicle is subjected to an impact load more than or equal to a predefined value, the gas generated by the gas generator is supplied into the airbag, thereby inflating and deploying the airbag.

In addition, this airbag includes a circular mounting-side panel cloth and a circular occupant-side panel cloth that is arranged so as to oppose the mounting-side panel cloth. A pair of left and right exhaust ports (gas vent holes) is provided in an upper portion of the occupant-side panel cloth.

Patent Document 1: Japanese Unexamined Patent Application Publication No. 2005-271736

The above-described related art document discloses the general structure of an airbag apparatus in which exhaust ports are provided in an airbag.

To optimize the airbag apparatus having such a structure, operational timing for inflating and deploying of the airbag and a gas exhausting operation from the exhaust ports are required to be optimized from the viewpoint of reducing harm to an occupant.

An object of the present invention is to provide an airbag apparatus for optimizing the operational timing of an inflating and deploying operation of an airbag and a gas exhausting operation from an exhaust port.

Further objects and advantages of the invention will be apparent from the following description of the invention/

SUMMARY OF THE INVENTION

To achieve the above object, an airbag apparatus according to a first aspect includes a gas generator that generates gas and an airbag that is inflated and deployed by the gas supplied from the gas generator so as to restrain an occupant in a first state in which the occupant's chin is positioned on the airbag apparatus or the occupant in a second state in which the occupant's chin is positioned on a steering wheel. The airbag includes one main exhaust port for which a vent cover is provided and at least one sub exhaust port without a vent cover. From the sub exhaust port, the airbag apparatus is able to exhaust the gas without using the main exhaust port in a state in which the vent cover blocks the main exhaust port due to a folded state of the airbag in an initial stage of an inflating and deploying operation performed to restrain the occupant in the first state or the second state.

The airbag apparatus according to the first aspect of this application includes the gas generator that generates the gas and the airbag. This airbag is inflated and deployed by the gas supplied from the gas generator and restrains the occupant in the first state in which the occupant's chin is positioned on the airbag apparatus or the occupant in the second state in which the occupant's chin is positioned on the steering wheel. This airbag is also provided with one main exhaust port for which the vent cover is provided.

Here, compared with the occupant in a normal state, contact of the occupant in the first or second state with the airbag generally occurs at an earlier timing. This increases the possibility of the airbag coming into contact with the occupant in the first or second state in the initial stage of the inflating and deploying operation of the airbag. In this initial stage of the inflating and deploying operation, the folded state of the airbag has not been released yet. Therefore, the vent cover blocks the main exhaust port due to the airbag being in the folded state, thereby restricting gas exhaustion from this main exhaust port to the outside of the airbag. By doing this, gas discharge can be restricted until a time when the airbag comes into contact with the occupant in the first or second state. Thus, the inner pressure of the airbag can be rapidly increased (without using a high-powered gas generator in particular) and can be maintained properly. As a result, performance in restraining the occupant in the first or second state can be improved.

In addition, according to the first aspect of this application, at least one sub exhaust port without a vent cover is provided in the airbag. This sub exhaust port is structured such that the airbag apparatus is able to exhaust the gas from the sub exhaust port without using the main exhaust port. Therefore, the gas can be exhausted from this sub exhaust port even in the initial stage of the inflating and deploying operation in which gas exhaustion from the main exhaust port is restricted. This can suppress a sharp increase in the inner pressure of the airbag in the initial stage of the inflating and deploying operation of the airbag. Thus, the airbag can restrain the occupant in the first or the second state in a softened manner.

Then, when the airbag is further inflated and deployed, and the folded state of the airbag is released, blocking of the main exhaust port by the vent cover is also released. This allows the gas to be exhausted from the main exhaust port and the sub exhaust port. Thus, by exhausting the gas from a plurality of exhaust ports, or in other words, by increasing an area usable for exhaustion (sum of the areas of the exhaust ports), rapid exhaustion can be performed. In addition, as described above, since the vent cover is provided for the main exhaust port, gas exhaustion in the initial stage of the inflating and deploying operation of the airbag is restricted. Thus, the port diameter of the main exhaust port can be enlarged. This allows the inner pressure of the airbag to rapidly decrease in and after the intermediate stage of the inflating and deploying operation of the airbag.

As a result, operational timing of the inflating and deploying operation of the airbag and the gas exhausting operation from the exhaust ports can be optimized.

In the airbag device of a second aspect, according to the first invention, the at least one sub exhaust port of the airbag includes a plurality of sub exhaust ports, and the sub exhaust ports are provided on either side of a line connecting the center in a radial direction of a panel provided in the airbag to the main exhaust port.

According to the second aspect of this application, the plurality of sub exhaust ports are provided on either side of the line connecting the center in the radial direction of the panel to the main exhaust port. By doing this, exhaustion can be performed in a well-balanced manner from both sides of the airbag. In addition, since the plurality of sub exhaust ports is provided, even when one of the sub exhaust ports fails to exhaust the gas for some reason, the gas can still be exhausted from the other sub exhaust ports. As a result, the function of the sub exhaust ports can be desirably achieved.

In the airbag apparatus of a third aspect, according to the second aspect, the number of sub exhaust ports of the airbag is two, and the ratio of the port diameter of the one main exhaust port to the port diameter of each of the sub exhaust ports is specified to be in a range from 2 to 5.

According to the third aspect of the application, the two sub exhaust ports are provided, and the ratio of the port diameter of the main exhaust port to the port diameter of each of the sub exhaust ports is specified to be in a range from 2 to 5. This can suppress occurrence of a situation in which the port diameter of each of the sub exhaust ports is too small to sufficiently perform exhaustion, and, as a result, the inner pressure of the airbag becomes too high. This can also suppress occurrence of the opposite situation in which the port diameter of each of the sub exhaust ports is so large that excessive exhaustion is caused, and as a result, the inner pressure of the airbag becomes too low. Thus, a desirable exhausting performance can be obtained.

In addition, the inner pressure of the airbag can easily be adjusted by appropriately adjusting the port diameter of the main exhaust port and the port diameter of each of the sub exhaust ports such that the ratio of the port diameter of the main exhaust port to the port diameter of each of the sub exhaust ports is within a range from 2 to 5. By doing this, a gas generator having different output characteristics can be used.

In the airbag apparatus of a fourth aspect, according to the first invention, the first state and the second state are respectively Driver position 1 and Driver position 2 specified in requirements of the North American rule, United States Federal Motor Vehicle Safety Standard 208 (FMVSS 208).

As the performance requirements of the airbag apparatus, for example, the requirements in FMVSS 208 are specified. According to the fourth aspect of the application, the first and second states correspond to Driver position 1 and Driver position 2 specified in the above rule. By doing this, the airbag apparatus can achieve performances required by the above rule.

According to the present invention, operational timing of the inflating and deploying operation of the airbag and the gas exhausting operation from the exhaust ports can be optimized.

DETAILED DESCRIPTION OF THE INVENTION

Hereinafter, embodiments of the present invention will be described with reference to the drawings.

Figure 1:
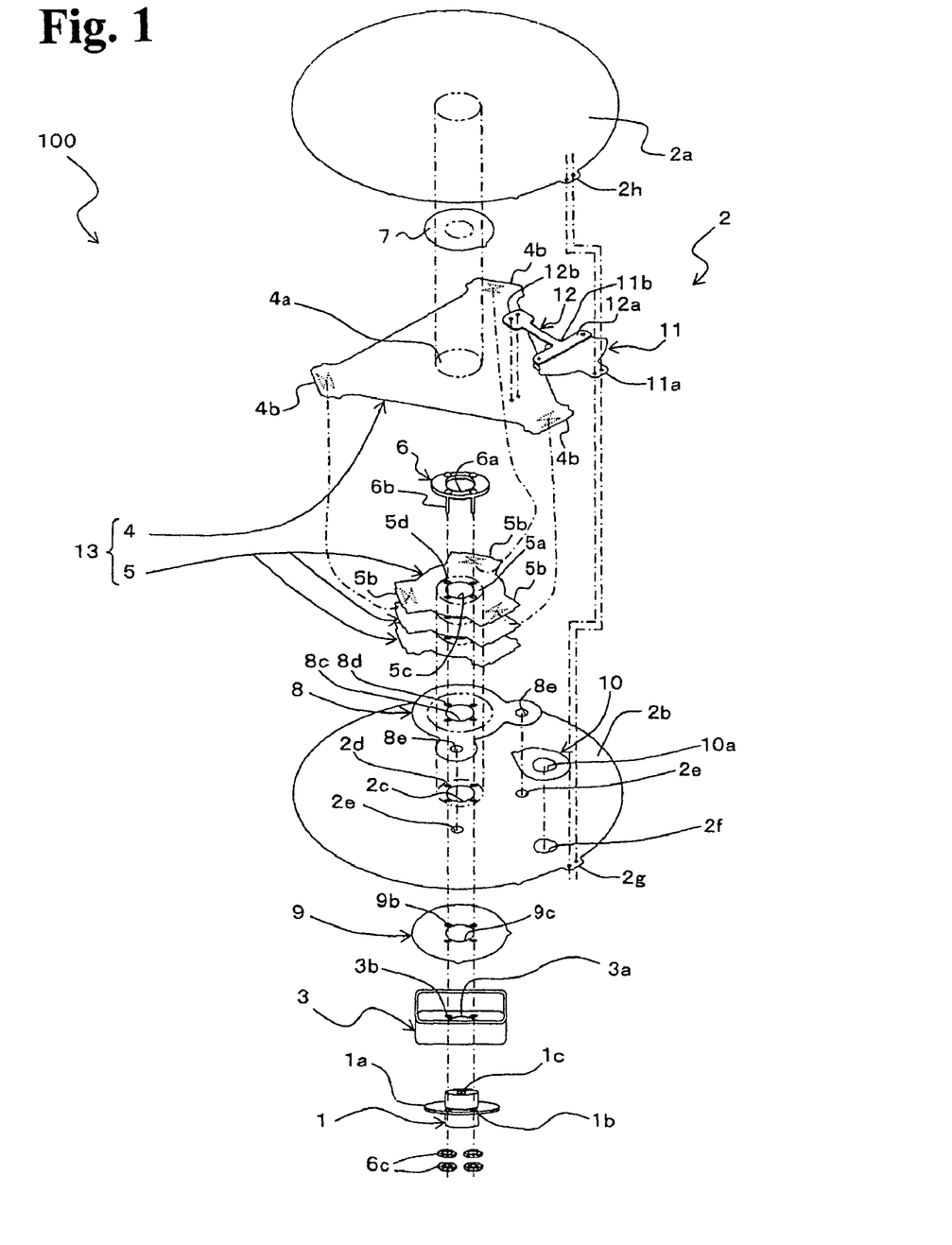
FIG. 1 is an exploded perspective view illustrating an airbag apparatus of an embodiment of the present invention.
Figure 2A:
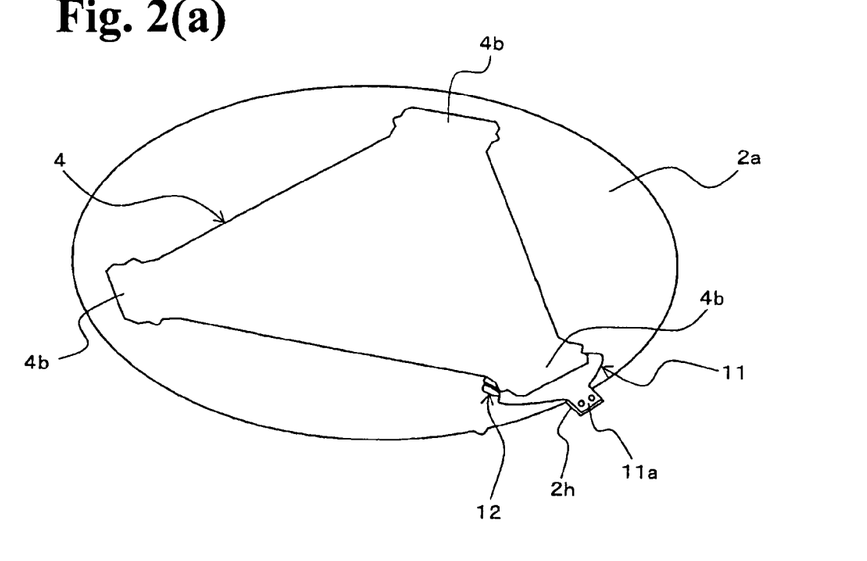
FIGS. 2(a) and 2(b) are explanatory diagrams of an inner panel and a connection panel.
Figure 2B:
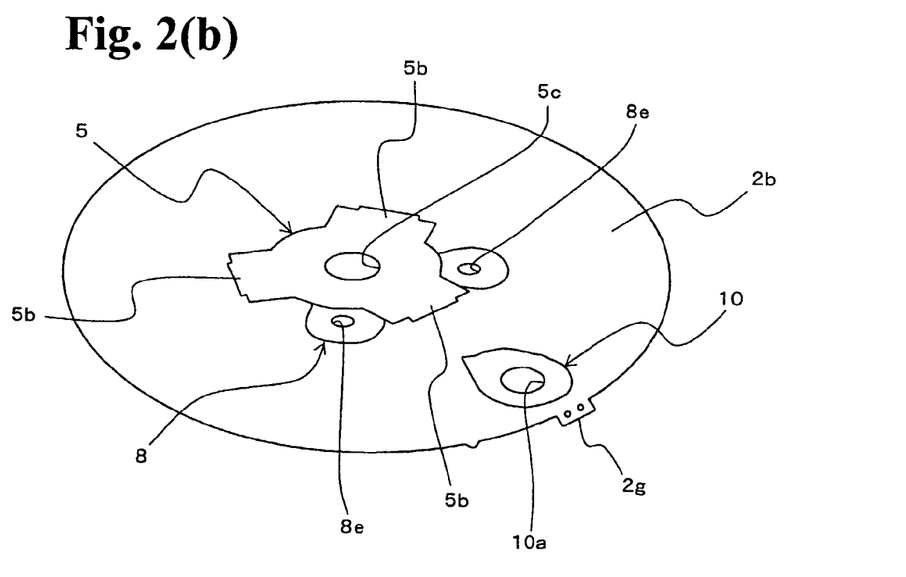

FIG. 1 is an exploded view illustrating an airbag apparatus of this embodiment. FIGS. 2(a) and 2(b) are explanatory diagrams of an inner panel and a connection panel, wherein FIG. 2(a) is a planar developed view of the inner panel and FIG. 2(b) is a planar developed view of the connection panel. It is to be noted that, for reference facilitating comparison of the sizes of the components, FIG. 2(a) illustrates a state in which a front panel, a reinforcement cloth (not shown in FIG. 2(a)), a vent cover, and a strap are coaxially superposed, and FIG. 2(b) illustrates a state in which a rear panel and a plurality of enforcement cloths are coaxially superposed.

In these FIGS. 1, 2(a), and 2(b), an airbag apparatus 100 of this embodiment is a driver airbag apparatus installed in a steering wheel 20 (refer to FIGS. 4(a) and 4(b) described below) of a vehicle. The airbag apparatus 100 includes a gas generator 1 that generates gas and an airbag 2 that is inflated and deployed by the gas supplied from the gas generator 1.

The gas generator 1 is a component generally referred to as an inflator, and is provided with a gas outlet hole 1c formed in an end of the gas generator 1 contained inside the airbag 2. In addition, the gas generator 1 is centrally provided with a flange portion 1a in which a plurality of bolt holes 1b is formed. The gas generator 1 having such a configuration is connected to an ECU (electronic control unit), which is not shown, and is controlled on the basis of measurements taken by an acceleration sensor, and the like. When the ECU detects or predicts a rapid deceleration or a vehicle crash, the gas generator 1 is ignited by an ignition current from the ECU. As a result, an agent contained in the gas generator 1 is burnt to generate gas, which is supplied to the airbag 2.

The airbag 2 restrains an occupant M (refer to FIGS. 4(a) and 4(b) that will be described below) who is in a state in which the occupant M has placed his or her chin on the airbag apparatus 100 (first state, hereinafter referred to as "first position" as needed), or the occupant M who is in a state in which the occupant M has placed his or her chin on the steering wheel 20 (second state, hereinafter referred to as "second position" as needed). The first position and the second position described above are out of a regular position, that is, so-called "out of positions (OOP)" (states) and respectively corresponding to Driver position 1 and Driver position 2 specified in requirements of the North American rule, United States Federal Motor Vehicle Safety Standard 208 (FMVSS 208).

Although the detailed descriptions of above-described FMVSS 208 are omitted herein, FMVSS 208 is a rule which specifies performance conditions in order to protect occupants of a vehicle when the occupants are involved in a vehicle crash. In other words, the airbag apparatus 100 of this embodiment is in compliance with the requirements of the above-described rule.

The airbag 2 includes a front panel 2a that forms an occupant facing surface, a rear panel 2b that forms a counter occupant surface opposite to the occupant facing surface, an internally arranged inner panel 4 formed in a substantially triangle shape, a plurality of (three in the example illustrated in the figure) connection panels 5 each being formed to be smaller in area than the inner panel 4, one main vent hole 2f (main exhaust port) and two sub vent holes 2e (sub exhaust ports) that connect the inner and external areas of the airbag 2 in order to exhaust the gas supplied from the gas generator 1 to the outside of the airbag 2, a vent cover 11 that restricts discharging of the gas from the main vent hole 2f, and a strap 12 that serves as a connecting member connecting the vent cover 11 to the inner panel 4. Each of the front panel 2a and rear panel 2b is formed of a circular woven cloth. In addition, the front panel 2a and the rear panel 2b are formed to be of substantially the same diameter. Peripheral portions of the front panel 2a and the rear panel 2b are stitched together to form a bag body.

A connection end 2h, which is provided in a periphery of the front panel 2a, protrudes outward in a radial direction.

The one main vent hole 2f and the two sub vent holes 2e are formed in the rear panel 2b. The vent cover 11 is superposed with the main vent hole 2f from the inner side of the airbag 2 with the reinforcement cloth 10, which will be described below, arranged therebetween. By doing this, the main vent hole 2f is placed in a blocked state (state in which gas exhaustion is restricted) when the airbag 2 is in a folded state. In addition, an opening 2c used to guide the gas generator 1 into the airbag 2 is formed in the central portion of the rear panel 2b, and a plurality of bolt holes 2d is formed around the opening 2c. A connection end 2g, which is provided in a periphery of the rear panel 2b, protrudes outward in a radial direction.

In addition, components attached to the rear panel 2b include a reinforcement cloth 8 that reinforces a peripheral portion of the opening 2c and a peripheral portion of each of the sub vent holes 2e from the inner side of the airbag 2 (upper side of the rear panel 2b in FIG. 1), a reinforcement cloth 9 that reinforces the peripheral portion of the opening 2c from the outer side of the airbag 2 (lower side of the rear panel 2b in FIG. 1), and a reinforcement cloth 10 that reinforces a peripheral portion of the main vent hole 2f from the inner side of the airbag 2 (upper side of the rear panel 2b in FIG. 1).

An opening 8c. used to guide the gas generator 1 into the airbag 2 is formed in the central portion of the reinforcement cloth 8, and a plurality of bolt holes 8d is formed around the opening 8c. In addition, two openings 8e, which are arranged substantially concentrically with the sub vent holes 2e, are formed in the reinforcement cloth 8.

An opening 9c used to guide the gas generator 1 into the airbag 2 is formed in the central portion of the reinforcement cloth 9, and a plurality of bolt holes 9b is formed around the opening 9c.

An opening 10a, which is arranged substantially concentrically with the main vent hole 2f, is formed in the reinforcement cloth 10.

The inner panel 4 includes a central stitched portion 4a that is connected to the inner surface of the front panel 2a with the reinforcement cloth 7 arranged therebetween and a plurality of (three in the example illustrated in the figure) connection ends 4b that are connected to connection ends 5b of the connection panels 5, which will be described below, arranged on the inner surface of the rear panel 2b. These three connection ends 4b, each of which is provided in the periphery of the inner panel 4, protrude outward in radial directions. Although the inner panel 4 illustrated in FIG. 1 and FIG. 2(a) is generally formed in a substantially triangular shape, that does not limit the shape of the inner panel 4. For example, the inner panel 4 may generally be formed in a substantially circular shape where outer edges between the connection ends 4b bulge outward to form arc-like shapes.

The connection panels 5 are members that connect the airbag 2 to the inner panel 4. Each of the connection panels 5 includes a central stitched portion 5a that is connected to the rear panel 2b with the reinforcement cloth 8 arranged therebetween and a plurality of (three in the example illustrated in the figure) connection ends 5b that are connected to the connection ends 4b of the inner panel 4. In addition, an opening 5c used to guide the gas generator 1 into the airbag 2 is formed in the central portion of each of the connection panels 5, and a plurality of bolt holes 5d is formed around each opening 5c. Although the connection panels 5 illustrated in FIG. 1 and FIG. 2(b) are generally formed in a substantially circular shape, that does not limit the shape of the connection panels 5.

Furthermore, the inner panel 4 and the connection panels 5 are connected by being stitched together at connecting portions (not shown) where the inner surfaces (lower surfaces in FIG. 1) of the connection ends 4b of the inner panel 4 and the outer surfaces (lower surfaces in FIG. 1) of the connection ends 5b of the connection panels 5 are superposed so as to be in contact with each other. The inner panel 4 and the connection panels 5 are combined to constitute an inner chamber 13 when the airbag 2 is inflated and deployed.

The vent cover 11 restricts discharging (exhausting) of the gas from the main vent hole 2f by covering the main vent hole 2f from the inner side of the airbag 2. to block the main vent hole 2f. In the vent cover 11, an end 11a thereof is connected to the connection end 2h of the front panel 2a and the connection end 2g of the rear panel 2b, and another end 11b is connected to an end 12a, which will be described below, of the strap 12.

In the strap 12, the end 12a thereof is connected to the end 11b of the vent cover 11, and another end 12b thereof is connected to the outer surface (upper surface in FIG. 1) of the inner panel 4. The strap 12 may be integrated with the inner panel 4. In such a case, the strap may be formed in such a manner as to partially extend from the outer shape of the inner panel 4. The strap 12 may also be integrated with the vent cover 11. In such a case, the strap may extend from the end 11b of the vent cover 11.

The airbag 2 structured as described above is folded in a state in which the vent cover 11 and the main vent hole 2f are superposed with each other, is secured to a retainer 3 using a presser ring 6, and is stored in the retainer 3.

The retainer 3 is box-shaped, and has, in the central portion of a bottom portion, an opening 3a used to guide the gas generator 1 into the airbag 2. A plurality of bolt holes 3b is formed around the opening 3a. The shape of the retainer 3 may vary. For example, a retainer may be structured using different materials for the side surfaces and the bottom portion. In such a case, the bottom portion may be referred to as the retainer and the side surfaces may be referred to as a module cover. However, those portions are generally referred to as a retainer herein. In other words, the retainer 3 refers to the member that secures the gas generator 1 and the airbag 2, and the member that stores the airbag 2 thereinside.

The presser ring 6 is a member used to secure the airbag 2 to the retainer 3. An opening 6a used to guide the gas generator 1 into the airbag 2 is formed in the central portion of the presser ring 6. In addition, a plurality of bolt holes (not shown) is formed around the opening 6a. Bolts 6b are inserted through the respective bolt holes. The bolts 6b are inserted through the corresponding bolt holes 5d of the connection panels 5, the bolt holes 8d of the reinforcement cloth 8, the bolt holes 2d of the rear panel 2b, the bolt holes 9b of the reinforcement cloth 9, the bolt holes 3b of the retainer 3, and the bolt holes 1b of the gas generator 1 in that order, and are finally fastened to nuts 6c.

Figure 3:
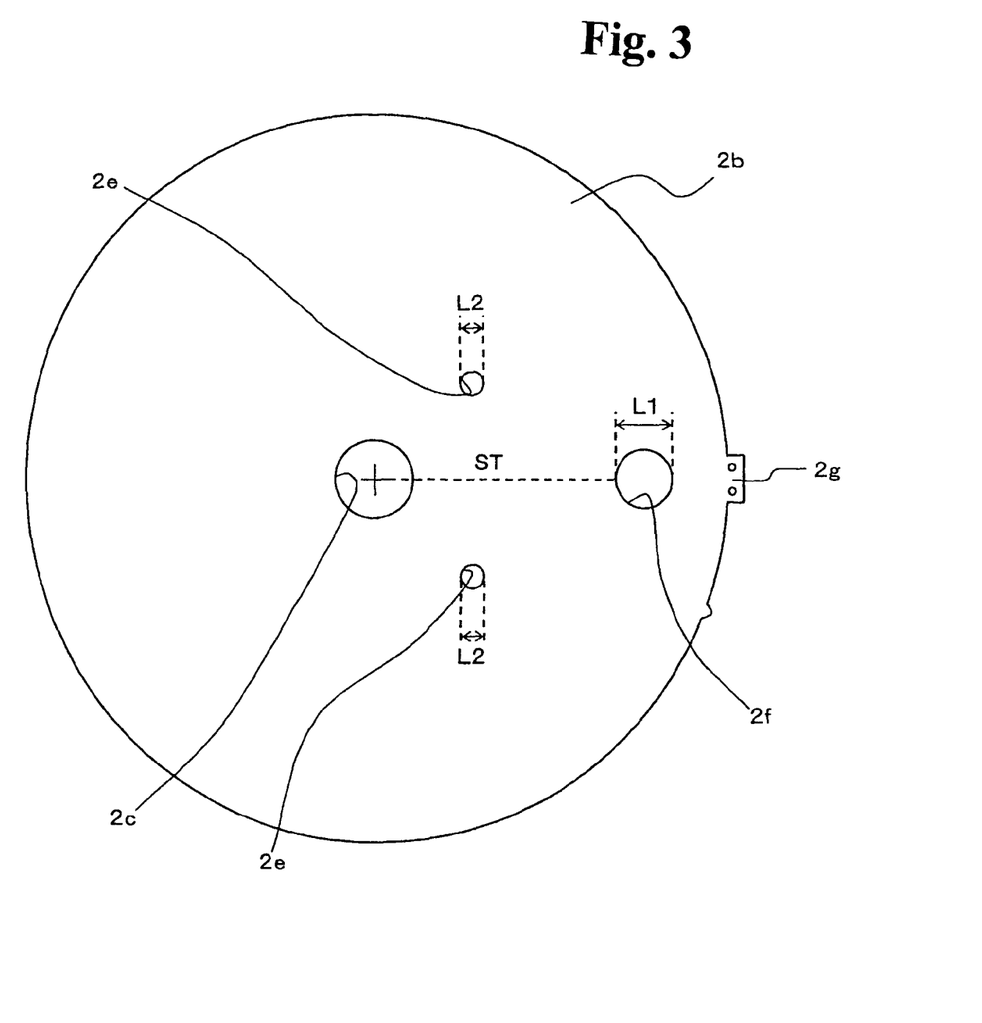
FIG. 3 is an explanatory diagram of a main vent hole and sub vent holes.

FIG. 3 is an explanatory diagram of the main vent hole 2f and the sub vent holes 2e, both being provided in the rear panel 2b.

In FIG. 3, as described above, the opening 2c, the one main vent hole 2f, the two sub vent holes 2e, and the connection end 2g are provided in the rear panel 2b.

The vent cover 11 (refer to FIG. 1 and the like) is provided for the main vent hole 2f. Therefore, the main vent hole 2f is in the blocked state using the vent cover 11 until the folded state of the airbag 2 is released. This restricts exhaustion of the gas, which has been supplied from the gas generator 1, to the outside of the airbag 2.

In contrast, no covering members such as the vent cover 11 described above are provided for the sub vent holes 2e. Therefore, the gas supplied from the gas generator 1 can be exhausted to the outside of the airbag 2 from the sub vent holes 2e (without using the main vent hole 2f) even before the folded state of the airbag 2 is released.

In addition, the sub vent holes 2e are provided on one side (upper side in FIG. 3) and on the other side (lower side in FIG. 3) of a line ST connecting the center in the radial direction of the rear panel 2b to the main vent hole 2f.

In this embodiment, a ratio (L1/L2) of a hole diameter L1 of the one main vent hole 2f to a hole diameter L2 of each of the sub vent holes 2e is specified to be in a range from 2 to 5. For example, the hole diameter L1 of the main vent hole 2f is given as 55 mm and the hole diameter L2 of each of the sub vent holes 2e is given as 22 mm. In this case, L1/L2 above is calculated as follows:

$$L1/L2 = 55 \text{ mm}/22 \text{ mm} = 2.5.$$

Next, an inflating and deploying operation of the airbag apparatus 100 for the occupant M in the first position will be described.

Figure 4A:
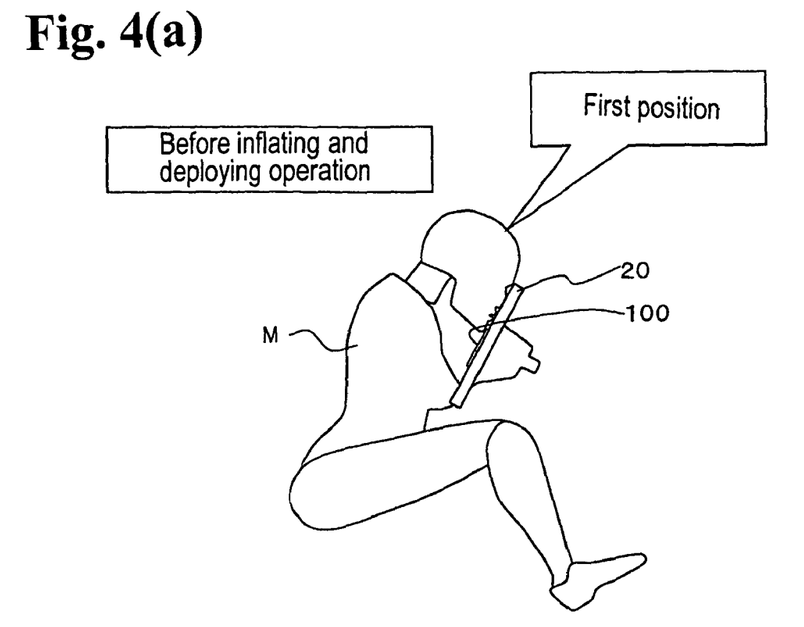
FIGS. 4(a) and 4(b) are explanatory diagrams illustrating an inflating and deploying operation of the airbag apparatus for an occupant in a first position.
Figure 5A:
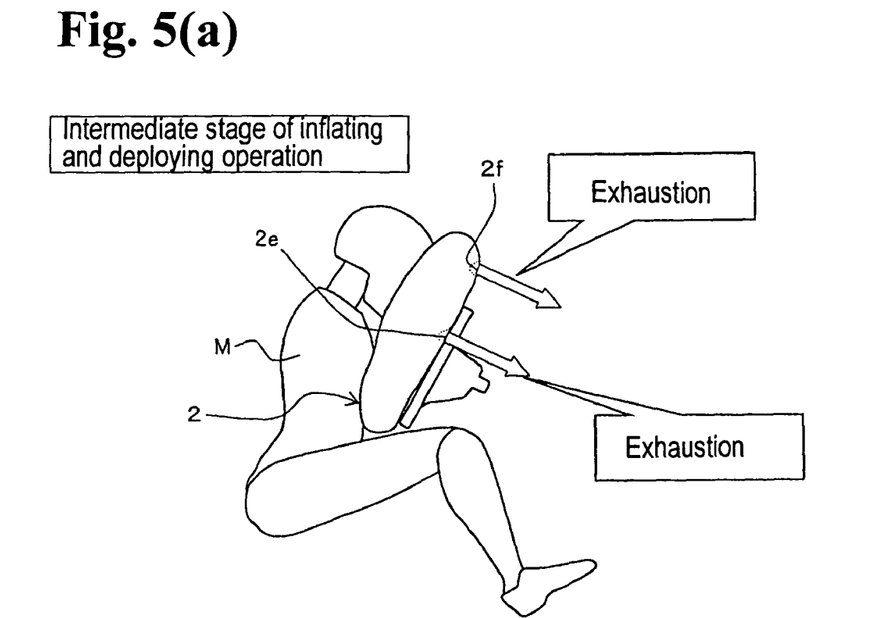
FIGS. 5(a) and 5(b) are explanatory diagrams illustrating the inflating and deploying operation of the airbag apparatus for the occupant in the first position.
Figure 5B:
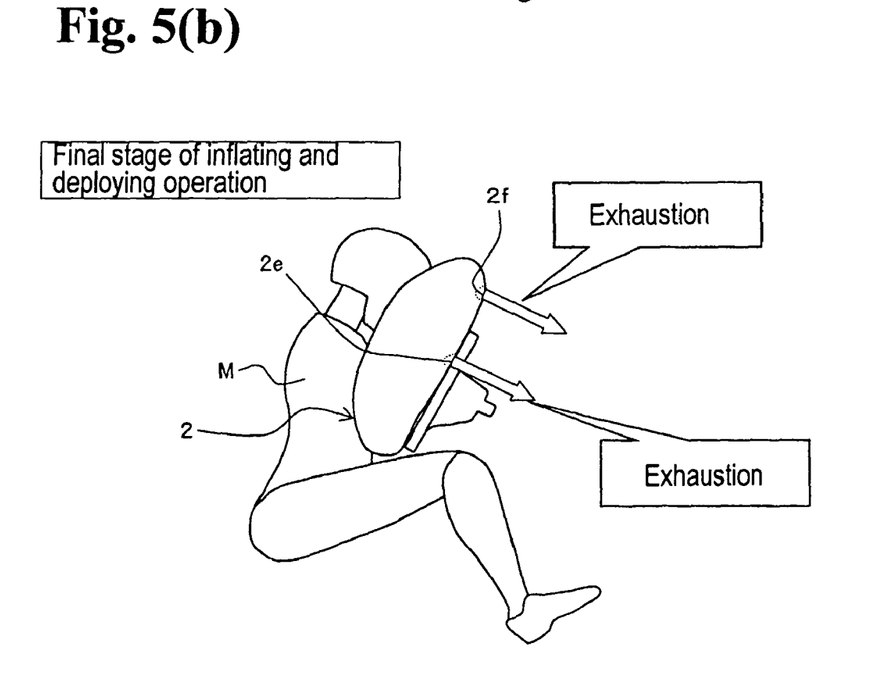
Figure 6A:
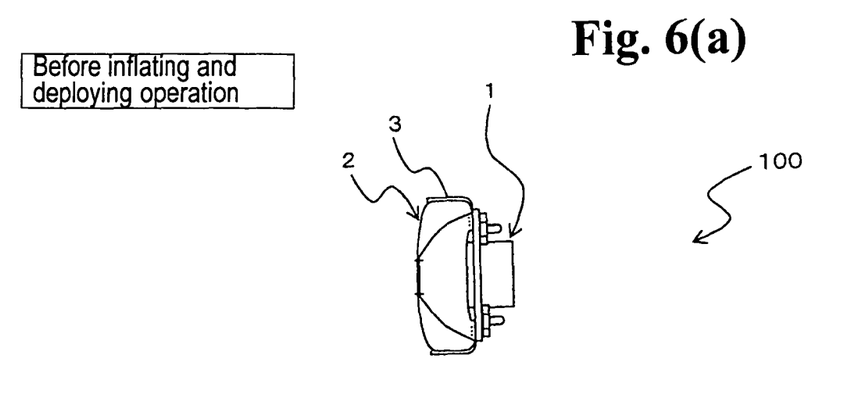
FIGS. 6(a) and 6(b) are explanatory diagrams illustrating the inflating and deploying operation of the airbag apparatus for the occupant in the first position.
Figure 6B:
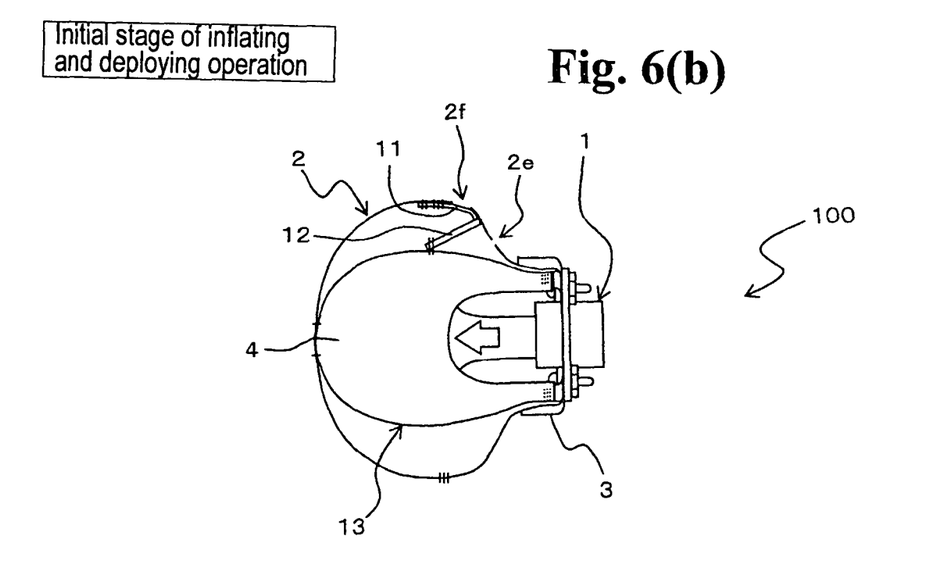
Figure 7A:
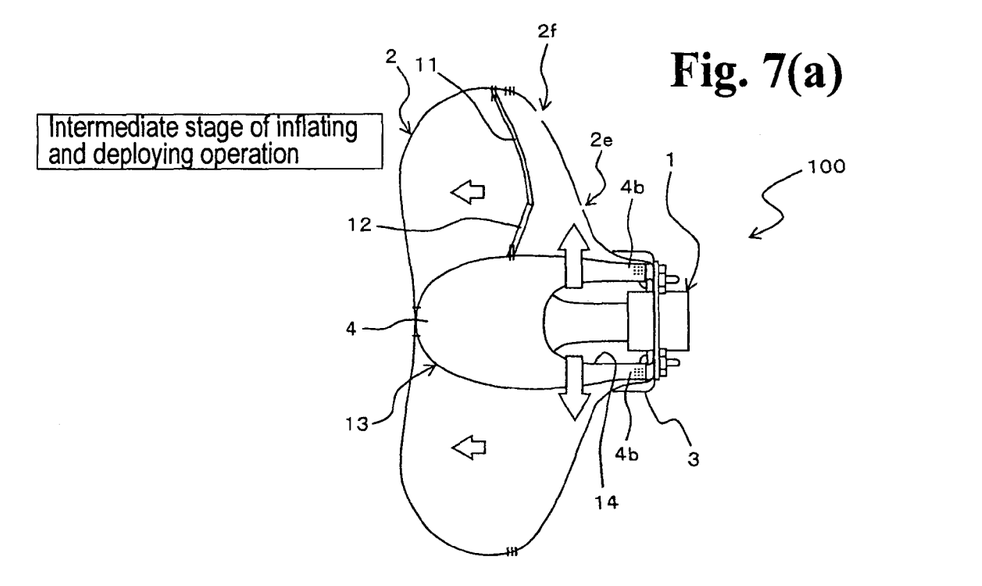
FIGS. 7(a) and 7(b) are explanatory diagrams illustrating the inflating and deploying operation of the airbag apparatus for the occupant in the first position.
Figure 7B:
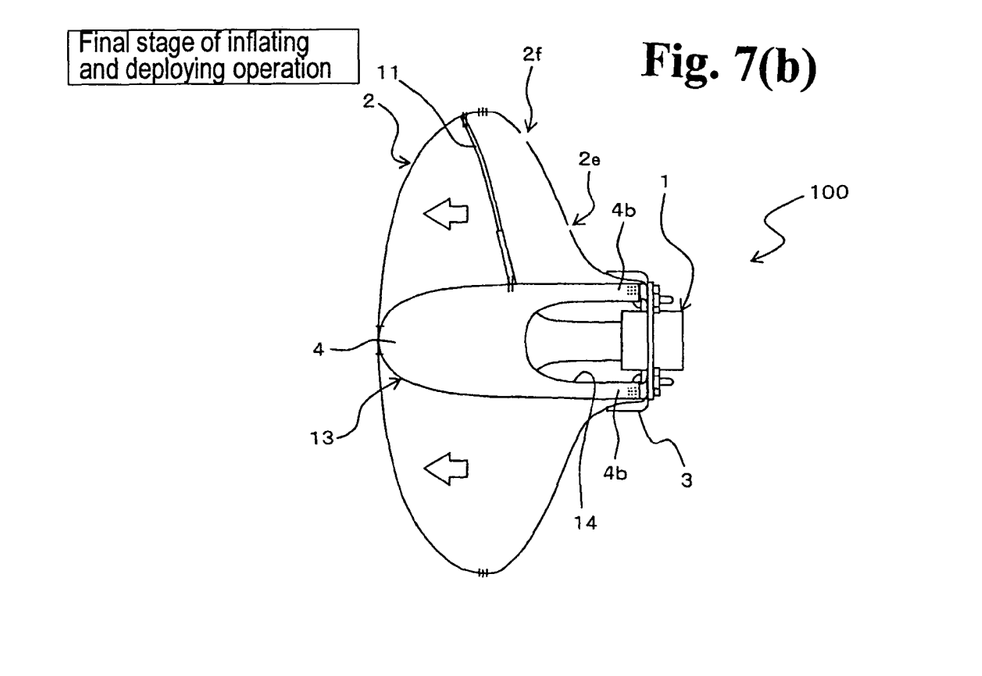

FIGS. 4(a) to 7(b) are explanatory diagrams illustrating the inflating and deploying operation of the airbag apparatus 100 for the occupant M in the first position. FIGS. 4(a) and 6(a) illustrate the states of the airbag 2 before the inflating and deploying operation is performed, FIGS. 4(b) and 6(b) illustrate the states of the airbag 2 in an initial stage of the inflating and deploying operation, FIGS. 5(a) and 7(a) illustrate the states of the airbag 2 in an intermediate stage of the inflating and deploying operation, and FIGS. 5(b) and 7(b) illustrate the states of the airbag 2 in a final stage of the inflating and deploying operation. In each figure, the arrows in the drawings indicate the flow directions of the gas.

An example in FIGS. 4(a), 4(b), 5(a), 5(b), 6(a), 6(b), 7(a), and 7(b) illustrates a case where the occupant M sitting in a driver seat is an occupant M in the first position, that is, in a state in which the occupant's chin is positioned on the airbag apparatus 100. In addition, as described above, the airbag apparatus 100 is installed in the steering wheel 20.

Here, the occupant M in the first position is in a state where the occupant M sits closer to the airbag apparatus 100 than the occupant M in a normal state (occupant M in the regular position). Therefore, contact of the occupant M with the airbag 2 generally occurs at an earlier timing. In this example, as will be described below, the occupant M in the first position contacts with the airbag 2 from the initial stage of the inflating and deploying operation.

In other words, before the inflating and deploying operation of the airbag 2 starts, the airbag 2 provided in the airbag apparatus 100 is stored in the retainer 3 in the folded state as illustrated in FIGS. 4(a) and 6(a). In this state, when, for example, a vehicle crash or the like occurs, the gas generator 1 is actuated by a command from the above-described ECU and the gas is supplied into the airbag 2. Thus, the inflating and deploying operation for restraining the occupant M in the first position starts.

Figure 4B:
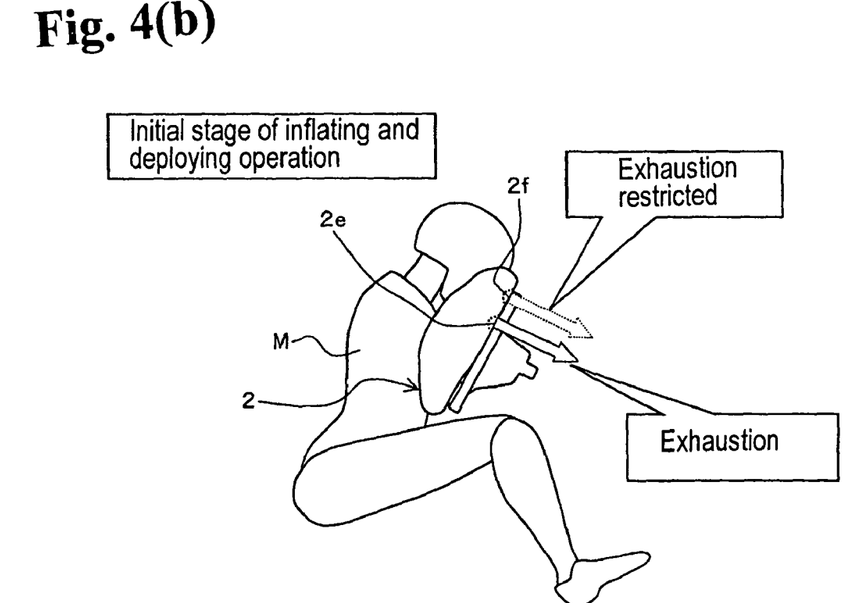

First, as illustrated in FIGS. 4(b) and 6(b), in the initial stage of the inflating and deploying operation of the airbag 2, the gas is intensively supplied to the above-described inner chamber 13. An area near the central portion of the airbag 2, in which this inner chamber 13 is provided, is inflated and deployed earlier than the peripheral portion of the airbag 2. In addition, by inflating and deploying the airbag 2 toward the occupant M side, the strap 12, which is connected to the inner panel 4 and the vent cover 11, is also pulled toward the occupant M side. However, in this initial stage of the inflating and deploying operation, the airbag 2 has not been sufficiently inflated and deployed, and the folded state has not been fully released. Therefore, the vent cover 11 connected to the strap 12 is still blocking the main vent hole 2f and gas exhaustion from the main vent hole 2f is restricted.

In contrast, since the two sub vent holes 2e (only one of the two is illustrated in FIGS. 4(a) to 7(b)) are not provided with covering members such as the vent cover 11, the sub vent holes 2e are in an open state even in the initial stage of this inflating and deploying operation, unlike the main vent hole 2f. Thus, during the initial stage of this inflating and deploying operation, the gas contained in the airbag 2 is exhausted from the sub vent holes 2e to the outside of the airbag 2.

Next, as illustrated in FIGS. 5(a) and 7(a), in the intermediate stage of the inflating and deploying operation of the airbag 2, the gas is discharged from communicating holes 14, which are formed between two adjacent connection ends 4b of the inner panel 4, to the outside of the inner panel 4, thereby inflating and deploying the peripheral portion of the airbag 2 in the width direction (up-down direction in FIGS. 4(a) to 7(b)) and gradually in the thickness direction (right-left direction in FIGS. 4(a) to 7(b)). Then, by inflating and deploying the airbag 2 toward the occupant M side, the strap 12 is pulled toward the occupant M side. Along with this movement, the vent cover 11 is also pulled toward the occupant M side by the strap 12 and moved away from the main vent hole 2f. This releases blocking of the main vent hole 2f with the vent cover 11, that is, releasing restriction of gas exhaustion from the main vent hole 2f. Accordingly, in this intermediate stage of the inflating and deploying operation, the gas contained in the airbag 2 is exhausted to the outside of the airbag 2 from the sub vent holes 2e and the main vent hole 2f.

Then, as illustrated in FIGS. 5(b) and 7(b), in the final stage of the inflating and deploying operation of the airbag 2, the entirety of the airbag 2 is inflated and deployed in the thickness direction. Gas exhaustion in this final stage of the inflating and deploying operation is substantially the same as that in the intermediate stage of the inflating and deploying operation.

In the example illustrated in FIGS. 4(a) to 7(b), the inflating and deploying operation of the airbag 2 for the occupant M in the first position has been described as an example. An inflating and deploying operation of the airbag 2 for the occupant M in the above-described second position, that is, in a state in which the occupant M has placed his or her chin on the steering wheel 20 can be substantially the same as the inflating and deploying operation described with reference to FIGS. 4(a) to 7(b).

The following advantages can be obtained by the airbag apparatus 100 of this embodiment structured as described above.

That is, the airbag 2 provided in the airbag apparatus 100 of this embodiment is inflated and deployed by the gas supplied from the gas generator 1 to restrain the occupant M in the first or second position. This airbag 2 includes the main vent hole 2f for which the vent cover 11 is provided.

Here, compared with the occupant M in the normal state, contact of the occupant M in the first or second position with the airbag 2 generally occurs at an earlier timing. This increases the possibility that the airbag 2 comes into contact with the occupant M in the first or second position in the initial stage of the inflating and deploying operation of the airbag 2. In this initial stage of the inflating and deploying operation, the vent cover 11 blocks the main vent hole 2f due to the folded state of the airbag 2, thereby restricting gas exhaustion from this main vent hole 2f. By doing this, gas discharge can be restricted until a time when the airbag 2 comes into contact with the occupant M in the first or second position. Thus, an inner pressure of the airbag 2 can be rapidly increased (without using a high-powered gas generator 1 in particular) and can be maintained properly. As a result, performance in restraining the occupant M in the first or second position can be improved.

In addition, in this embodiment, a plurality of (two in the above example) sub vent holes 2e without vent covers is provided in the airbag 2. These sub vent holes 2e are structured such that the airbag apparatus 100 is able to exhaust the gas from the sub vent holes 2e without using the main vent hole 2f. Therefore, the gas can be exhausted from these sub vent holes 2e even in the initial stage of the inflating and deploying operation in which gas exhaustion from the main vent hole 2f is restricted. This can suppress a sharp increase in the inner pressure of the airbag 2 in the initial stage of the inflating and deploying operation of the airbag 2. Thus, the airbag 2 can restrain the occupant M in the first or second position in a softened manner.

Then, when the airbag 2 is further inflated and deployed and the folded state of the airbag 2 is released, blocking of the main vent hole 2f by the vent cover 11 is also released. This allows the gas to be exhausted from the main vent hole 2f and the sub vent holes 2e. Thus, by exhausting the gas from a plurality of (three in the above example) vent holes 2e and 2f, or in other words, by increasing an area usable for exhaustion (the sum of the areas of the vent holes 2e and 2f), rapid exhaustion can be performed. In addition, as described above, since the vent cover 11 is provided for the main vent hole 2f, gas exhaustion in the initial stage of the inflating and deploying operation of the airbag 2 is restricted. Thus, the hole diameter L1 of the main vent hole 2f can also be enlarged. This allows the inner pressure of the airbag 2 to rapidly decrease in and after the intermediate stage of the inflating and deploying operation of the airbag 2.

As a result of these, operational timing of the inflating and deploying operation of the airbag 2 and the gas exhausting operation from vent holes 2e and 2f can be optimized.

Here, as the performance requirements of the airbag apparatus, for example, the requirements in FMVSS 208 are specified. Therefore, in this embodiment, the first and second positions particularly correspond to Driver position 1 and Driver position 2 specified in the above rule. By doing this, the airbag apparatus 100 can achieve performances required by the above rule.

Also in this embodiment, the airbag 2 particularly includes the plurality of (two in the above example) sub vent holes 2e. The sub vent holes 2e are provided on one side (upper side in FIG. 3) and on the other side (lower side in FIG. 3) of the line ST connecting the center in the radial direction of the rear panel 2b, which is provided in the airbag 2, to the main vent hole 2f. By doing this, exhaustion can be performed in a well-balanced manner from the both sides of the airbag 2. In addition, since the plurality of sub vent holes 2e is provided, even when one of the sub vent holes 2e fails to exhaust the gas for some reason, the gas can be exhausted from the other sub vent holes 2e. As a result, the function of the sub vent holes 2e can be desirably achieved.

Also in this embodiment, the airbag 2 is particularly provided with the two sub vent holes 2e, and the ratio (L1/L2) of the hole diameter L1 of the main vent hole 2f to the hole diameter L2 of each of the sub vent holes 2e is specified to be in a range from 2 to 5. This can suppress occurrence of a situation in which the hole diameter L2 of each of the sub vent holes 2e is too small to sufficiently perform exhaustion, and, as a result, the inner pressure of the airbag 2 becomes too high. This can also suppress occurrence of the opposite situation in which the hole diameter L2 of each of the sub vent holes 2e is so large that excessive exhaustion is caused, and as a result, the inner pressure of the airbag 2 becomes too low. Thus, a desirable exhausting performance can be obtained. In addition, the inner pressure of the airbag 2 can easily be adjusted by appropriately adjusting the hole diameter L1 of the main vent hole 2f and the hole diameter L2 of each of the sub vent holes 2e such that the above-described L1/L2 is within a range from 2 to 5. By doing this, a gas generator having different output characteristics can be used as the gas generator 1.

Although the above-described embodiment is one example of a preferable embodiment of the present invention, the present invention is not limited to the above embodiment. A variety of modifications to the embodiment can be carried out without departing from the gist of the present invention.

The disclosure of Japanese Patent Application No. 2009-256394 filed on Nov. 9, 2009 is incorporated herein as a reference.

What is claimed is:

1. An airbag apparatus, comprising:
   a gas generator that generates gas; and
   an airbag inflated and deployed by the gas supplied from the gas generator, the airbag being configured to restrain an occupant,
   wherein the airbag includes:
   a front panel having at least one connecting end,
   a rear panel connected to the front panel at peripheries thereof, and having another connecting end, one main exhaust port, and at least one sub exhaust port without a vent cover,
   an inner panel connected to the front and rear panels in a center area of the airbag, and having a substantially triangular shape with a center portion connected to the front panel, and a plurality of connecting ends connected to a connecting panel fixed to the rear panel,
   a vent cover provided to cover the one main exhaust port, and having a size greater than that of the one main exhaust port, one end connected to the at least one end and another connecting end of the front and rear panels, and another end, and
   a strap having one end fixed to the another end of the vent cover, and another end attached to the inner panel, and
   wherein the sub exhaust port exhausts the gas without using the main exhaust port in a state in which the vent cover blocks the main exhaust port due to a folded state of the airbag in an initial stage of an inflating and deploying operation performed to restrain the occupant.

2. The airbag apparatus according to claim 1, wherein the at least one sub exhaust port of the airbag includes a plurality of sub exhaust ports, and
   wherein the sub exhaust ports are provided on either side of a line connecting a center in a radial direction of a panel provided in the airbag to the main exhaust port.

3. The airbag apparatus according to claim 2, wherein the sub exhaust ports provided in the airbag are two sub exhaust ports, and
   wherein a ratio of a port diameter of the one main exhaust port to a port diameter of each of the sub exhaust ports is specified to be in a range of 2 to 5.

4. The airbag apparatus according to claim 1, wherein the airbag is configured to restrain an occupant in a first state in which an occupant's chin is positioned on the airbag apparatus or the occupant in a second state in which the occupant's chin is positioned on a steering wheel, and the first state and the second state are respectively Driver position 1 and Driver position 2 specified in requirements of North American rule, United States Federal Motor Vehicle Safety Standard 208.

5. The airbag apparatus according claim 1, wherein the at least one end and another connecting end project outwardly from the respective front and rear panels.

6. The airbag apparatus according to claim 5, wherein the airbag is configured such that the inner panel is inflated first by the gas from the gas generator, and then the gas flows from the inner panel to an outside of the inner panel where the vent cover is pulled to open the exhaust port.

* * * * *